United States Patent
Rogakos et al.

[11] 3,984,998
[45] Oct. 12, 1976

[54] ENERGY ABSORBING COUPLING

[75] Inventors: Deno J. Rogakos, Kettering; Lynn M. Johnston, West Milton, both of Ohio

[73] Assignee: General Motors Corporation, Detroit, Mich.

[22] Filed: Sept. 12, 1975

[21] Appl. No.: 612,779

[52] U.S. Cl. .............................. 64/27 C; 64/15 R; 64/27 R
[51] Int. Cl.² .................................... F16D 3/14
[58] Field of Search ............ 64/27 NM, 27 C, 27 B, 64/27 R, 27 S, 15 R, 15 B

[56] References Cited
UNITED STATES PATENTS

| | | | |
|---|---|---|---|
| 1,238,778 | 9/1917 | Jern | 64/27 C |
| 1,334,557 | 3/1920 | Ruff | 64/15 B |
| 1,495,207 | 5/1924 | Rybeck | 64/15 B |
| 2,099,359 | 11/1937 | Woodeson et al. | 64/DIG. 2 |
| 2,783,627 | 3/1957 | Rossman | 64/27 R |
| 3,728,871 | 4/1973 | Cligsen | 64/27 R |

*Primary Examiner*—Samuel Scott
*Assistant Examiner*—Randall Heald
*Attorney, Agent, or Firm*—John P. Moran

[57] ABSTRACT

An energy absorbing coupling for use with an electric motor-driven window regulator mechanism, including a torsion spring arrangement between an input gear and an output pinion which provides (1) a driving connection in either direction, and (2) a relative movement or lost-motion connection for absorbing the energy generated by the inertia of the electric motor armature when the window reaches its limit of movement in one direction of the other.

5 Claims, 5 Drawing Figures

ENERGY ABSORBING COUPLING

This invention relates generally to energy absorbing couplings and, more particularly, to couplings for use with vehicular electric motor-driven window regulator mechanisms.

Electric motor-driven, or so-called "power" window regulators must be rendered inoperative when the window has reached its limit of movement whether up or down. It is essential that the mechanism include lost-motion or relative movement means between the input and output members thereof for absorbing the energy generated by inertia of the armature once the window has reached a fully open or fully closed stop condition. Such motor deenergizing movement has been determined to be in the order of 10° to 15° angular movement of the input member once the output member has stopped.

Heretofore, energy absorbing couplings for vehicular electric motor-driven window regulator mechanisms have generally included an input gear, an output pinion, and either an intermediate neoprene rubber member bonded at one side thereof to the gear and at the other side thereof to the pinion, or intermediate flexible resilient rollers or cushioning elements adapted to be compressed or deformed when subjected to an excessive torque, and which resume a normal driving relationship upon release of such torque.

While such couplings have performed satisfactorily, an object of this invention is to provide an energy absorbing coupling which utilizes an intermediate torsion spring drive arrangement in lieu of the bonded rubber drive connection.

Another object of the invention is to provide an energy absorbing coupling including a torsion spring arrangement which provides a driving connection in either direction, and which provides an additional lost-motion connection for absorbing the energy generated by the inertia of an armature, once an obstruction to the drive is encountered.

A further object of the invention is to provide an energy absorbing coupling including a torsion spring having radially inwardly bent ends which abut against portions of an input means and are positioned slightly apart from portions of an output means, such that movement of the input means in either direction urges one of the bent ends in that direction while urging the other bent end into contact with the output means to thereby drive the latter, and, once the output means is stopped, permits the one bent end to move through an additional arcuate length to absorb the energy generated by the inertia of an armature of an electric motor drive unit.

Still another object of the invention is to provide an energy absorbing coupling including an input gear with a spring retainer cup secured thereto and a pair of radially extending surfaces formed thereon, an output pinion having an axial flange formed thereon and extending concentrically into the spring retainer cup, a peripheral opening formed in the flange, a torsion spring mounted in the space between the cup and the flange and having radially inwardly bent ends formed thereon extending past the respective circumferential edges of the opening and into contact with the respective radially extending surfaces, providing both a driving and an energy absorbing or lost-motion connection between one of the radially extending surfaces and the adjacent bent spring-end on the one hand, and the other bent spring-end and the adjacent edge of the opening on the other hand, while rotating in one direction, with the reverse being true for rotation in the opposite direction.

These and other objects and advantages of the invention will be apparent when reference is made to the following description and accompanying drawings, wherein.

Figure 1:
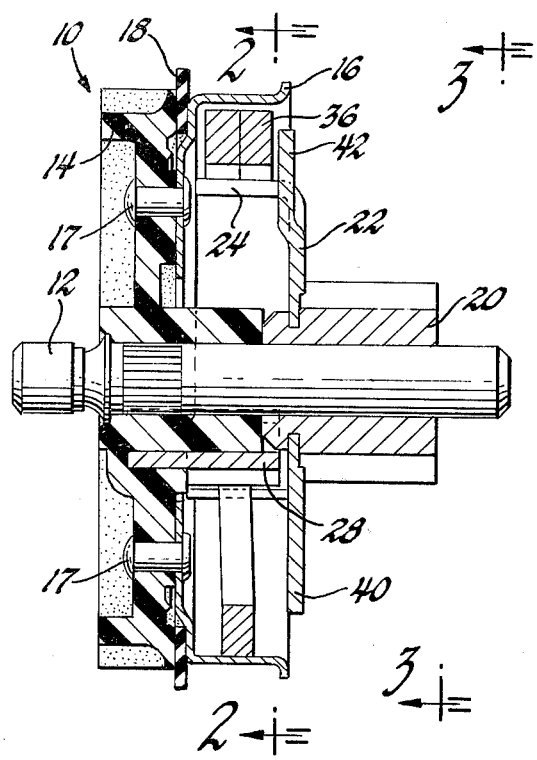
FIG. 1 is a cross-sectional view of an energy absorbing coupling embodying the invention.
Figure 2:
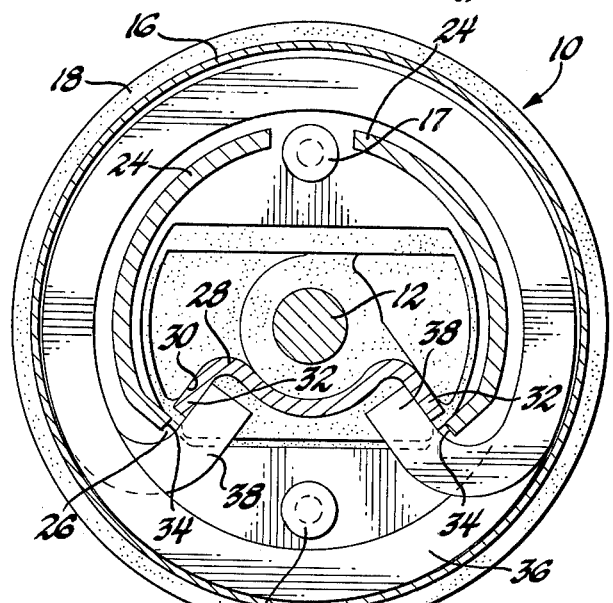
FIG. 2 is a cross-sectional view taken along the plane of line 2—2 of FIG. 1, and looking in the direction of the arrows.
Figure 3:
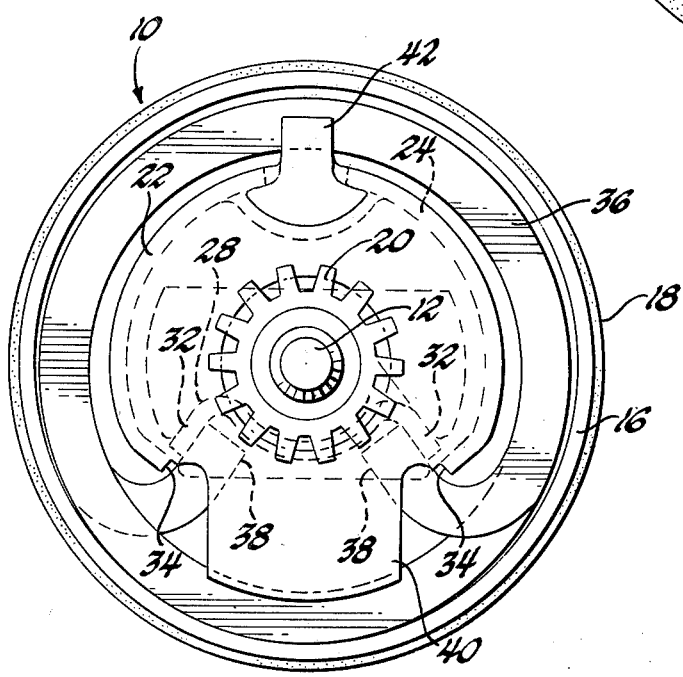
FIG. 3 is an end view taken along the plane of line 3—3 of FIG. 1, and looking in the direction of the arrows.

Referring now to the drawings in greater detail, FIGS. 1–3 illustrate an energy absorbing coupling 10 including a shaft 12 and an input gear 14 secured in any suitable manner adjacent one end of the shaft 12. A spring retainer cup 16 is secured by rivets 17 to a side of the input gear 14 with a seal 18 confined therebetween. An output pinion 20 is rotatably mounted on the shaft 12 adjacent the other end thereof. A disk 22 is secured in any suitable manner to a side of the output pinion 20, with a flange 24 formed on the disk 22 and extending concentrically within the spring retainer cup 16. A peripheral opening 26 of a predetermined arcuate length is formed in the flange 24.

A clip 28 is press-fitted into a contoured opening 30 formed in the side of the input gear 14 on which the spring retainer cup 16 is secured, and a pair of tabs 32 are formed on the clip 28 extending radially outwardly toward the respective circumferential edges 34 of the peripheral opening 26. A torsion spring 36 having a pair of radially inwardly bent ends 38 formed thereon and spaced a predetermined arcuate distance apart, is mounted in the radial space between the flange 24 and the spring retainer cup 16, such that the ends 38 extend past the circumferential edges 34 of the opening 26 and abut against the tabs 32 while the spring 36 is in its free state.

Typically, in an energy absorbing coupling 10 formed in accordance with the invention, the angle between tabs 32 is 74°; the angle between bent ends 38 is 77°; and the angle between the circumferential edges 34 is 94°.

The torsion spring 36 is also formed so as to contact the spring retainer cup 16 in the area adjacent the space intermediate the bent ends 38 to prevent the bent ends from being force outwardly by the tabs 32 in the operative mode. A pair of oppositely disposed tabs 40 and 42 (FIG. 3) are formed on the disk 22 to prevent the torsion spring 36 from being forced axially out of the radial space between the flange 24 and the retainer cup 16.

Figure 4:
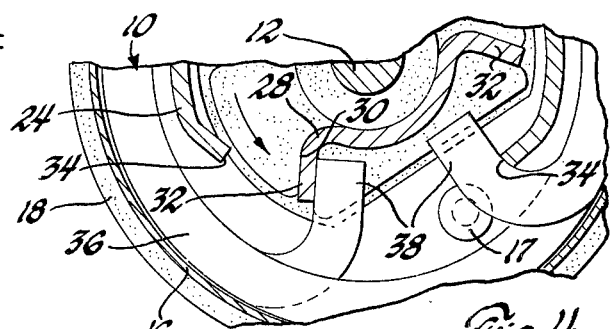
FIG. 4 is a fragmentary view of a portion of the FIG. 2 components in an operational condition.

In operation, rotation of the input gear 14 causes one of the tabs 32 to urge the adjacent bent end 38 toward the other tab 32, against the force of the torsion spring 36 inasmuch as the other bent end 38 is urged into contact with the adjacent edge 34 of the peripheral opening 26 in the flange 24. The resultant movements of the flange 24 and its associated disk 22 serve to drive the output pinion 20. Once the output pinion 20 encounters an obstruction or a load condition, the one tab 32 and the adjacent bent end 38 will continue to move toward the other tab 32 a distance sufficient to absorb the resultant energy, for example, 10° to 15°, as indicated above. This condition is illustrated in FIG. 4 and will remain as shown until such time as the input gear 14 is rotated in the opposite direction, at which time the relative movements and positions of the components will reverse.

Figure 5:
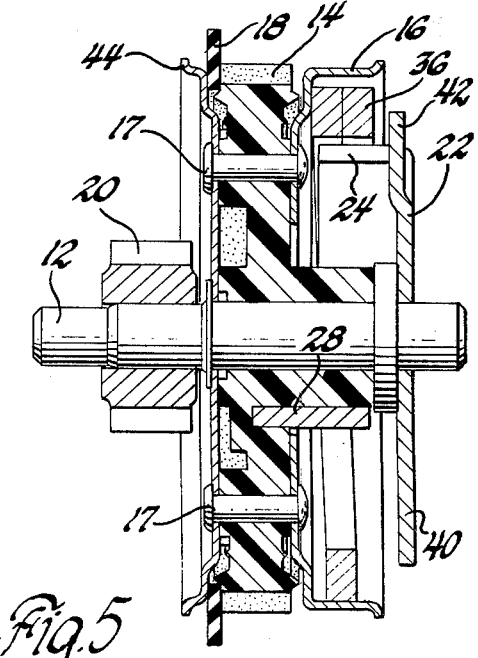
FIG. 5 is a cross-sectional view of an alternate embodiment of the invention.

The alternate embodiment shown in FIG. 5 is similar to the FIG. 1 structure and, accordingly, the components thereof comparable to those of FIG. 1 bear the same reference numerals. In the arrangement of FIG. 5, the pinion 20 is secured to the shaft 12 on the end thereof opposite that shown in FIG. 1. The disk 22 is likewise secured to the shaft 12 on the end thereof opposite the pinion 20. The input gear 14 and associated spring retainer cup 16 are rotatably mounted on the shaft 12 between the pinion 20 and the disk 22. The seal 18 is mounted between the input gear 14 and the pinion 20, and retained against the side of the input gear 14 by a seal retainer 44 secured to the input gear 14 by the rivets 17. The seal 18 in each embodiment serves to prevent water from entering into the area of the input gear 14 and the input means [not shown] associated therewith in a power window application, for example. In such an application, the output pinion 20 would engage a conventional sector [not shown] for driving a vehicular window up or down.

Insofar as the tabs 32, the torsion spring-ends 38, and the edges 34 on the flange 22 are concerned, the resultant driving connection therebetween is the same in the FIG. 5 arrangement as in the FIG. 1 arrangement.

It should be apparent that the invention provides a simple, readily manufactured, and efficient energy absorbing coupling, without requiring a bonded rubber driving means, suitable for a variety of applications, including particularly a vehicular power window assembly.

While but two embodiments of the invention have been shown and described, other modifications thereof are possible.

We claim:

1. An energy absorbing coupling comprising a rotatable shaft, rotatable input and output means mounted on said shaft, one of said input and output means being secured to said shaft and the other being journaled thereon, a spring retainer cup secured to said input means, axial flange means operatively connected to said output means for rotation therewith and extending concentrically into said cup, a peripheral opening of a predetermined arcuate length formed in said axial flange means, radially extending spaced tabs secured to said input means and extending outwardly toward the respective circumferential edges of said peripheral opening in said flange means, and a torsion spring mounted in the radial space between said flange means and said cup and having radially inwardly bent ends spaced a predetermined distance apart and extending past said circumferential edges of said flange means and adjacent said tabs in the free state, one bent end being urged by said adjacent tab toward the other tab against the force of said torsion spring in response to rotation of said input means, and the other bent end being urged into contact with the adjacent edge of said opening to thereby provide a driving connection between said input and output means through said tabs, said torsion spring and said axial flange means, said one of said bent ends and said tab adjacent thereto continuing to move toward said other tab a distance sufficient to absorb the resultant energy once said output means encounters a stop condition.

2. An energy absorbing coupling comprising a rotatable shaft, rotatable input means and rotatable output means mounted on said shaft, one of said input and output means being secured thereto, a spring retainer cup secured to said input means, a disk mounted for rotation with said output means, said disk having a flange spaced radially inwardly from said cup, a peripheral opening of a predetermined arcuate length formed on said flange, a clip secured to said input means and having tabs extending outwardly toward the respective circumferential edges of said peripheral opening in said flange, and a torsion spring mounted in the radial space between said flange and said cup and having radially inwardly bent ends spaced a predetermined distance apart and extending past said circumferential edges of said flange and adjacent said tabs in the free state, said torsion spring being formed so as to contact said spring retainer cup at a point adjacent the space intermediate said bent ends to prevent said bent ends from being forced outwardly by said tabs in the operative mode whereupon one bent end is urged by said adjacent tab toward the other tab against the force of said torsion spring, and the other bent end being urged into contact with the adjacent edge of said opening to thereby provide a driving connection between said input and output means through said torsion spring and said disk, said one of said bent ends and said tab adjacent thereto continuing to move toward said other tab a distance sufficient to absorb the resultant energy once said output means encounters a stop condition.

3. An energy absorbing coupling comprising a rotatable shaft, rotatable input means secured to said shaft adjacent one end thereof, a spring retainer cup secured to said input means, rotatable output means journaled on said shaft adjacent the other end thereof, a disk secured to said output means, said disk having a flange spaced radially inwardly from said cup, a peripheral opening of a predetermined arcuate length formed on said flange, a clip secured to said input means and having tabs extending outwardly toward the respective circumferential edges of said peripheral opening in said flange, and a torsion spring mounted in the radial space between said flange and said cup and having radially inwardly bent ends spaced a predetermined distance apart and extending past said circumferential edges of said flange and adjacent said tabs in the free state, one bent end being urged by said adjacent tab toward the other tab against the force of said torsion spring in response to rotation of said input means, and the other bent end being urged into contact with the adjacent edge of said opening to thereby provide a driving connection between said input and output means through said torsion spring and said disk, said one of said bent ends and said tab adjacent thereto continuing to move toward said other tab a distance sufficient to absorb the resultant energy once said output means encounters a stop condition.

4. An energy absorbing coupling comprising a rotatable shaft, a gear secured to said shaft adjacent one end thereof, a spring retainer cup secured to said gear, a pinion journaled on said shaft adjacent the other end thereof, a disk secured to said pinion, said disk having a flange spaced radially inwardly from said cup, a peripheral opening of a predetermined arcuate length formed on said flange, a clip secured to said gear and having tabs extending outwardly toward the respective circumferential edges of said peripheral opening in said flange, and a torsion spring mounted in the radial space between said flange and said cup and having radially inwardly bent ends spaced a predetermined distance apart and extending past said circumferential edges of said flange and adjacent said tabs in the free state, said torsion spring being formed so as to contact said spring retainer cup at a point adjacent the space intermediate said bent ends to prevent said bent ends from being forced outwardly by said tabs in the operative mode whereupon one bent end is urged by said adjacent tab toward the other tab against the force of said torsion spring, and the other bent end being urged into contact with the adjacent edge of said opening to thereby provide a driving connection between said gear and said pinion through said torsion spring and said disk, said one of said bent ends and said tab adjacent thereto continuing to move toward said other tab a distance sufficient to absorb the resultant energy once said pinion encounters a stop condition.

5. An energy absorbing coupling comprising a rotatable shaft, a gear rotatably mounted on said shaft, a spring retainer cup secured to said gear, a pinion secured to said shaft adjacent one end thereof, a disk secured to said shaft adjacent the other end thereof, said disk having a flange spaced radially inwardly from said cup, a peripheral opening of a predetermined arcuate length formed on said flange, a clip secured to said gear and having tabs extending outwardly toward the respective circumferential edges of said peripheral opening in said flange, and a torsion spring mounted in the radial space between said flange and said cup and having radially inwardly bent ends spaced a predetermined distance apart and extending past said circumferential edges of said flange and adjacent said tabs in the free state, said torsion spring being formed so as to contact said spring retainer cup at a point adjacent the space intermediate said bent ends to prevent said bent ends from being forced outwardly by said tabs in the operative mode whereupon one bent end is urged by said adjacent tab toward the other tab against the force of said torsion spring, and the other bent end being urged into contact with the adjacent edge of said opening to thereby provide a driving connection between said gear and said pinion through said torsion spring and said disk, said one of said bent ends and said tab adjacent thereto continuing to move toward said other tab a distance sufficient to absorb the resultant energy once said pinion encounters a stop condition.

* * * * *